(12) United States Patent
Sun et al.

(10) Patent No.: US 11,997,358 B2
(45) Date of Patent: May 28, 2024

(54) VIDEO PROCESSING METHOD AND APPARATUS, DEVICE AND MEDIUM

(71) Applicant: BEIJING BYTEDANCE NETWORK TECHNOLOGY CO., LTD., Beijing (CN)

(72) Inventors: Hui Sun, Beijing (CN); Ziyang Zheng, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/885,902

(22) Filed: Aug. 11, 2022

(65) Prior Publication Data

US 2022/0394343 A1 Dec. 8, 2022

Related U.S. Application Data

(63) Continuation of application No. PCT/CN2021/083391, filed on Mar. 26, 2021.

(30) Foreign Application Priority Data

Apr. 29, 2020 (CN) .......................... 202010358480.4

(51) Int. Cl.
*H04N 21/4788* (2011.01)
*H04N 21/472* (2011.01)
*H04N 21/81* (2011.01)

(52) U.S. Cl.
CPC ... *H04N 21/4788* (2013.01); *H04N 21/47217* (2013.01); *H04N 21/8133* (2013.01)

(58) Field of Classification Search
CPC ......... H04N 21/4788; H04N 21/47217; H04N 21/8133
(Continued)

(56) References Cited

U.S. PATENT DOCUMENTS 10,684,738 B1 * 6/2020 Sicora .................... G06F 16/435
11,012,403 B1 * 5/2021 Paul ........................ H04L 51/52
(Continued)

FOREIGN PATENT DOCUMENTS

| CN | 104052765 A | 9/2014 |
|---|---|---|
| CN | 104980766 A | 10/2015 |

(Continued)

OTHER PUBLICATIONS

International Patent Application No. PCT/CN2021/083391; Int'l Search Report; dated Jun. 23, 2021; 3 pages.
(Continued)

*Primary Examiner* — Sherrod L Keaton
(74) *Attorney, Agent, or Firm* — BakerHostetler (57) ABSTRACT

Provided in embodiments of the present disclosure are a video processing method and apparatus, a device, and a medium. The method includes: receiving a play trigger operation for a forwarded video, the forwarded video being forwarded from an original video by a forwarding user; obtaining the original video, and forwarding comment information provided by the forwarding user on the original video when forwarding the original video; and playing the original video on a play interface of video works of the forwarding user, and displaying the forwarding comment information.

14 Claims, 6 Drawing Sheets

(58) Field of Classification Search
USPC .......................................................... 715/719
See application file for complete search history.

(56) References Cited

U.S. PATENT DOCUMENTS

| | | |
|---|---|---|
| 2012/0290953 A1 | 11/2012 | Russell et al. |
| 2014/0351717 A1* | 11/2014 | Pryor ................. G06F 16/9535 |
| | | 715/753 |
| 2015/0178502 A1* | 6/2015 | Shin ........................ H04L 51/04 |
| | | 726/26 |
| 2016/0029093 A1 | 1/2016 | Li et al. |
| 2016/0173625 A1* | 6/2016 | Ruben .................. H04L 67/306 |
| | | 709/204 |
| 2016/0359957 A1 | 12/2016 | Laliberte |
| 2017/0358016 A1 | 12/2017 | Avedissian et al. |
| 2018/0253765 A1 | 9/2018 | Avedissian et al. |

FOREIGN PATENT DOCUMENTS

| | | |
|---|---|---|
| CN | 105684455 A | 6/2016 |
| CN | 106412712 A | 2/2017 |
| CN | 107820131 A | 3/2018 |
| CN | 110688571 A | 1/2020 |
| CN | 110913266 A | 3/2020 |
| CN | 110933509 A | 3/2020 |
| CN | 111526411 A | 8/2020 |
| JP | 2009-071699 A | 4/2009 |
| JP | 2017-511546 A | 4/2017 |
| JP | 2017-199352 A | 11/2017 |
| KR | 2015-0030387 A | 3/2015 |

OTHER PUBLICATIONS

"How to Crack a Content that Has Been Deleted by the Publisher"; https://lingyan.baidu.com/article/fea4511a357b67/7bb9125f3.html; Jun. 29, 2017; 5 pages.
"How to forward a video on Douyin to your Douyin"; https://lingyan.baidu.com/article/c14654137e22014bfcfc4cf2.htm; Sep. 17, 2019; 10 pages.
China Patent Application No. 202010358480.4; First Office Action; dated Sep. 3, 2021; 18 pages.
China Patent Application No. 202010358480.4; Second Office Action; dated Jan. 21, 2022; 18 pages.
China Patent Application No. 202010358480.4; Rejection Decision; dated Jun. 15, 2022; 12 pages.
European Patent Application No. 21796856.9; Extended Search Report; dated Jun. 14, 2023; 10 pages.
"The content has been deleted by the publisher how to crack"; https://lingyan.baidu.com/article/fea4511a357b67f7bb9125f3.html; Baidu; Jun. 2017; 2 pages.

* cited by examiner

VIDEO PROCESSING METHOD AND APPARATUS, DEVICE AND MEDIUM

CROSS-REFERENCES TO RELATED APPLICATIONS

The present application a continuation of International Application No. PCT/CN2021/083391, filed on Mar. 26, 2021, which claims a priority to Chinese Patent Application No. 202010358480.4, titled "VIDEO PROCESSING METHOD AND APPARATUS, DEVICE AND MEDIUM", filed with the China National Intellectual Property Administration on Apr. 29, 2020. The disclosures of the applications are hereby incorporated by reference in their entireties.

FIELD

The present disclosure relates to the technical field of image processing, and particularly, the present disclosure relates to a video processing method and apparatus, a device, and a medium.

BACKGROUND

With the increasing popularity of video interaction platforms, more and more users like to express their emotions by posting videos. Meanwhile, the users may also comment and forward videos posted by others.

SUMMARY

This summary is provided to introduce concepts in a simplified form to be described in detail in embodiments below. However, this summary is neither intended to identify key or essential features of the claimed technical solutions, nor intended to limit the scope of the claimed technical solutions.

According to a first aspect of the present disclosure, a video processing method is provided. The method includes: receiving a play trigger operation for a forwarded video, the forwarded video being forwarded from an original video by a forwarding user; obtaining the original video, and forwarding comment information provided by the forwarding user on the original video when forwarding the original video; and playing the original video on a play interface of video works of the forwarding user, and displaying the forwarding comment information.

According to a second aspect of the present disclosure, a video processing apparatus is provided. The apparatus includes: a play trigger operation receiving module configured to receive a play trigger operation for a forwarded video, the forwarded video being forwarded from an original video by a forwarding user; an obtaining module configured to obtain the original video, and forwarding comment information provided by the forwarding user on the original video when forwarding the original video; and a playing module configured to play the original video on a play interface of video works of the forwarding user, and display the forwarding comment information.

According to a third aspect of the present disclosure, an electronic device is provided. The electronic device includes a memory having computer operation instructions stored thereon, and a processor. The processor is configured to, by calling the computer operating instructions, implement the method as described in any one of the embodiments of the first aspect of the present disclosure.

According to a fourth aspect of the present disclosure, a non-transitory computer-readable medium is provided. The non-transitory computer-readable medium has at least one instruction, at least one piece of program, a set of codes, or a set of instructions stored thereon. The at least one instruction, the at least one piece of program, the set of codes, or the set of instructions is loaded and executed by a processor to implement the method as described in any of the embodiments of the first aspect the present disclosure.

BRIEF DESCRIPTION OF DRAWINGS

The above and other features, advantages, and aspects of the embodiments of the present disclosure will become more apparent in conjunction with the accompanying drawings and with reference to the following specific implementations. Throughout the drawings, the same or similar reference numerals indicate the same or similar elements. It should be understood that the drawings are schematic, and the components and elements are not necessarily drawn to scale.

DESCRIPTION OF EMBODIMENTS

Embodiments of the present disclosure will be described below in more detail with reference to the accompanying drawings. Although some embodiments of the present disclosure are illustrated in the drawings, it should be understood that the present disclosure may be implemented in various forms and should not be construed as being limited to the embodiments set forth herein. On the contrary, these embodiments are provided to facilitate a more thorough and complete understanding of the present disclosure. It should be understood that the accompanying drawings and embodiments of the present disclosure are only used for exemplary purposes, rather than to limit the protection scope of the present disclosure.

It should be understood that steps described in the method embodiments of the present disclosure may be executed in different orders and/or in parallel. In addition, the method embodiments may include additional steps and/or omit executions of the illustrated steps. The scope of the present disclosure is not limited in this respect.

The term "include" and its variants as used herein indicate open-ended inclusions, i.e., "include, but not limited to". The term "based on" refers to "at least partially based on". The term "an embodiment" means "at least one embodiment"; the term "another embodiment" means "at least one additional embodiment"; and the term "some embodiments" means "at least some embodiments." Related definitions of other terms will be given in the following description.

It should be noted that, the expressions such as "first" and "second" mentioned in the present disclosure are only used to distinguish apparatuses, modules, or units. They are neither used to limit these apparatuses, modules, or units to be definitely different apparatuses, modules, or units, nor used to limit an order or interdependence of the functions performed by these apparatuses, modules, or units.

It should be noted that modifications such as "a", "an", and "plurality of" mentioned in the present disclosure are schematic instead of restrictive, and those skilled in the art shall understand that they mean "one or more", unless otherwise clearly indicated in the context.

In the embodiments of the present disclosure, names of messages or information exchanged between different apparatuses are only used for illustrative purposes, but not intended to limit the scope of these messages or information.

In the existing methods, when a user wants to forward a playing video recorded by others, the content of the forwarder's comment cannot be directly displayed on the play interface, thereby lowering the user's sense of experience.

Figure 1:
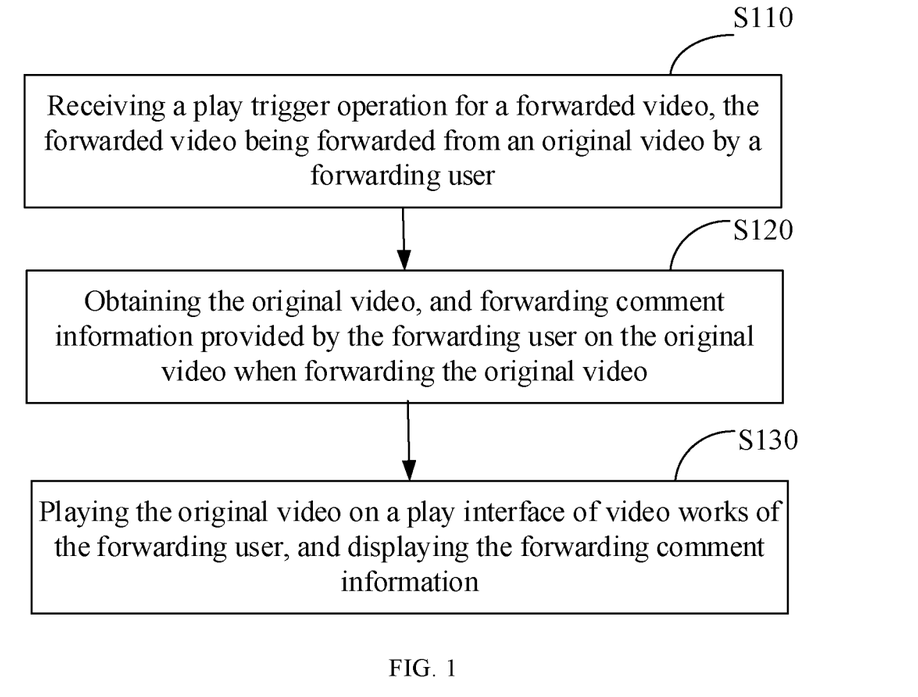
FIG. 1 is a schematic flowchart of a video processing method according to an embodiment of the present disclosure.

The embodiments of the present disclosure provide a video processing method, applicable to an application scenario of video forwarding in a video interactive application. As illustrated in FIG. 1, the method is executed by a terminal device, and the method may specifically include the following steps.

At S110: a play trigger operation for a forwarded video is received, and the forwarded video is forwarded from an original video by a forwarding user.

The play trigger operation refers to an action that the user wants to play the forwarded video, and the manner of triggering the play trigger operation may be preset, which is not limited in the embodiments of the present disclosure. For example, when a user clicks on the play interface of a video, it is deemed that a play trigger operation for the video is triggered. The original video may be an original video released by a certain user through a certain video interactive application, or the original video may be a forwarded video obtained after a certain video is forwarded at least once, which is not limited in the embodiments of the present disclosure. In practical applications, when a user forwards a video that she or he is more interested in, the user is the forwarding user, the video is the original video, and the video subjected to the forwarding is the forwarded video. In addition, it should be noted that a video resource of the forwarded video is a video resource of the original video, and the user who triggers the play trigger operation may be the same one as the forwarding user, or a user other than the forwarding user, which is not limited in the embodiments of the present disclosure.

In addition, in order to improve the user experience, when the user completes the forwarding of the video, the forwarded video may be associated with the user's account information in the video interactive application. For example, after the original video is forwarded by a user, a list of video works of the forwarding user may be added with the forwarded video, which is forwarded from the original video.

At S120, the original video, and forwarding comment information provided by the forwarding user on the original video when forwarding the original video are obtained.

In practical applications, when the user forwards the original video, the user may have some feelings about the original video. In this case, the user, when forwarding the video, may forward the forwarding comment information on the original video together.

Further, when the user's play trigger operation for the forwarded video is received, it means that the user wants to watch the forwarded video, and in this case, the original video corresponding to the forwarded video and the forward comment information on the original video when the forwarding user forwards the original video may be obtained.

At S130, the original video is played on a play interface of video works of the forwarding user, and the forwarding comment information is displayed.

Further, after obtaining the original video of the forwarded video, the original video may be played. The play interface for playing the original video is a play interface for playing the video works of the forwarding user. That is, the play interface used corresponds to a play interface for playing the video of the forwarding user, rather than corresponding to a play interface for playing the original video.

In addition, the play interface may also display the forwarding comment information provided by the forwarding user on the original video when forwarding the original video, and thus the user who views the forwarded video may know the forwarding user's feelings about the original video.

The forwarding comment information is displayed in a preset region of the play interface, which is not limited in the embodiments of the present disclosure. It can be understood that, the forwarding comment information may be displayed in a fringing region of the play interface, to reduce the occlusion of the original video when displaying the forwarding comment information, thereby improving the user's viewing experience. In addition, other relevant information associated with the forwarded video may also be displayed on the play interface, such as displaying the forwarding user's account avatar, the number of comments on the forwarded video, the number of likes, and other information.

Figure 2:
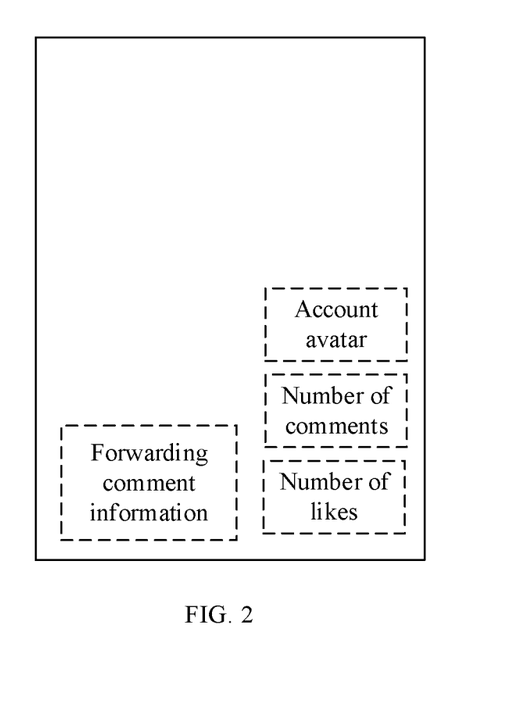
FIG. 2 is a schematic diagram of a play interface according to an embodiment of the present disclosure.

As an example, FIG. 2 illustrates a schematic diagram of a play interface according to an embodiment of the present disclosure provides. In this case, the forwarding comment information may be displayed in the lower left region of FIG. 2; and the forwarding user's account avatar, the number of comments on the forwarded video, the number of likes, and other information may be displayed in the lower right region in FIG. 2.

It should be noted that the execution order of the above actions S110 and S120 is not limited in the embodiments of the present disclosure, and different execution orders may be applicable to different application scenarios. When action S110 is performed first and then action S120 is performed, it may be an application scenario suitable for real-time video obtaining; and when action S120 is performed first and then action S110 is performed, it may be suitable for an application scenario in which a part of the video is cached in advance to reduce the video buffering time delay during video playing.

In the embodiment of the present disclosure, after the original video is forwarded by the forwarding user, the original video can be played once a play operation for the forwarded video is received. Instead of only displaying the comment information of the creator as in the related art, the forwarding comment information provided by the forwarding user on the original video during the forwarding can be displayed at the same time of playing the original video. In this case, it is convenient for the user to know the forwarding user's feelings about the forwarded video, thereby improving the user experience.

In this embodiment of the present disclosure, said displaying the forwarding comment information includes: displaying, in a specified display mode, the forwarding comment information on the play interface of the video works of the forwarding user. The specified display mode includes associating and displaying the forwarding comment information and information of the forwarded user in a specified special effect, and a display time length of the specified special effect.

The information of the forwarded user refers to associated information related to the forwarding user, such as the forwarding user's account information in the application, the number of comments and likes on the forwarded video by other users, and the like.

In practical applications, in order to improve the user's viewing experience and better highlight the forwarding comment information provided by the forwarding user on the original video, the forwarding comment information and the forwarding user information may be associated and displayed in a specified special effect. The specified special effects to be specifically adopted may be preset, which is not limited in the embodiments of the present disclosure. For example, a bubble special effect is used as the specified special effect, and the forwarding user information is an account avatar picture of the forwarding user. Correspondingly, when a play trigger operation for the forwarded video is received, a bubble may be displayed on the play interface of the video works of the forwarding user; the forwarding comment information provided by the forwarding user on the original video when forwarding the original video is displayed in the bubble; and the bubble is pointed to the account avatar of the forwarding user.

In an embodiment of the present disclosure, said displaying, in the specified display mode, the forwarding comment information on the play interface of the video works of the forwarding user includes: stopping, in response to a duration of displaying the specified special effect being equal to the display time length, a display of the specified special effect; or stopping, in response to receiving a stop display operation for the specified special effect, the display of the specified special effect.

Further, when the forwarding comment information is displayed on the play interface with the specified special effect for a long period of time, the user's view may be obstructed when viewing the forwarded video. Therefore, in the embodiment of the present disclosure, a time point when the play trigger operation is received may be a starting point of time, the forwarding comment information may be displayed in a specified special effect within the display time length. Once the display time length lapses, the display of the forwarding in the specified special effect is stopped, and the forwarding comment information will be displayed within a specific region instead.

In practical applications, when a stop display operation for the specified special effect is triggered by the user and received in the process of displaying the forwarding comment information in the specified special effect, it indicates that the user no longer wants to continue to use the specified special effect to display the forwarding comment information on the play interface. In this case, regardless of whether the display time length lapses, the specified special effect will be stopped.

The display time length and the specific region range may be preset, which are not limited in the embodiments of the present disclosure. Similarly, the specific region range may be set in a fringing region of the play interface, for example, in the lower left corner of the play interface, to reduce the occlusion of the original video by the displayed forwarding comment information, thereby further improving the user's viewing experience.

Figure 3A:
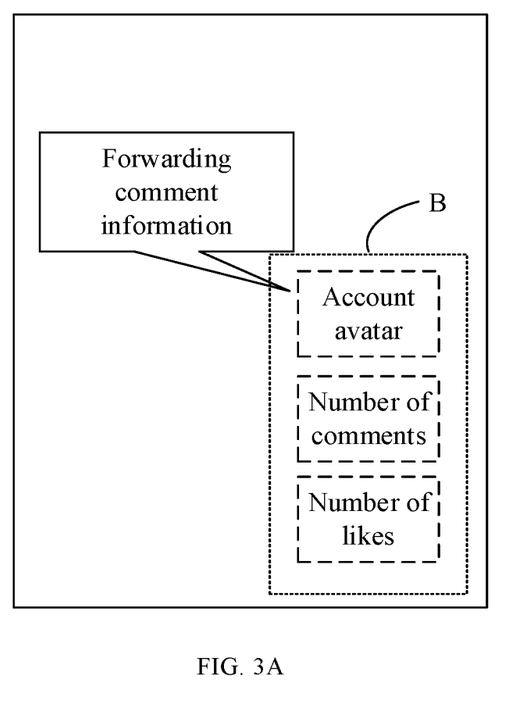
FIG. 3A is another schematic diagram of a play interface according to an embodiment of the present disclosure.
Figure 3B:
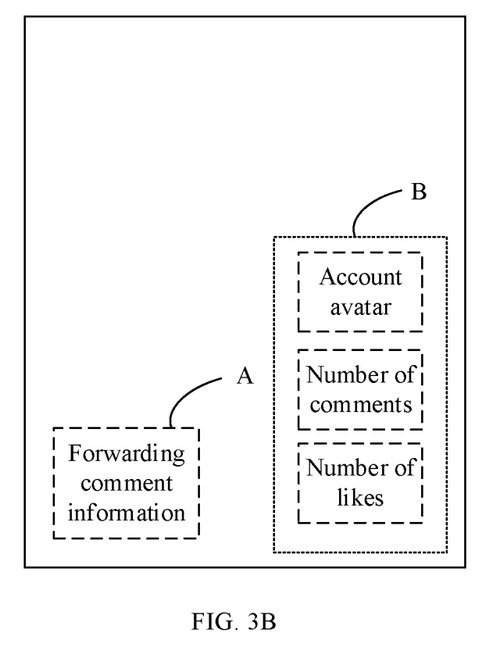
FIG. 3B is another schematic diagram of a play interface according to an embodiment of the present disclosure.

In an example, the set time length is 2 seconds, the forwarding user information is the account avatar of the forwarding user, and the specified special effect is a bubble effect. Correspondingly, when receiving a play trigger operation for the forwarding user's forwarded video, the original video of the forwarded video may be played on the play interface as illustrated in FIG. 3A, and a bubble special effect is loaded when the original video begins to play. The forwarding comment information provided by the forwarding user on the original video when forwarding the original video is displayed in the bubble, and the bubble is pointed to the account avatar picture of the forwarding user. Further, once the bubble special effect is displayed for two seconds, said displaying the forwarding comment information in the bubble special effect is stopped, and the forwarding comment information is displayed in region A instead. In this case, the play interface is as illustrated in FIG. 3B.

Figures 3C, 4:
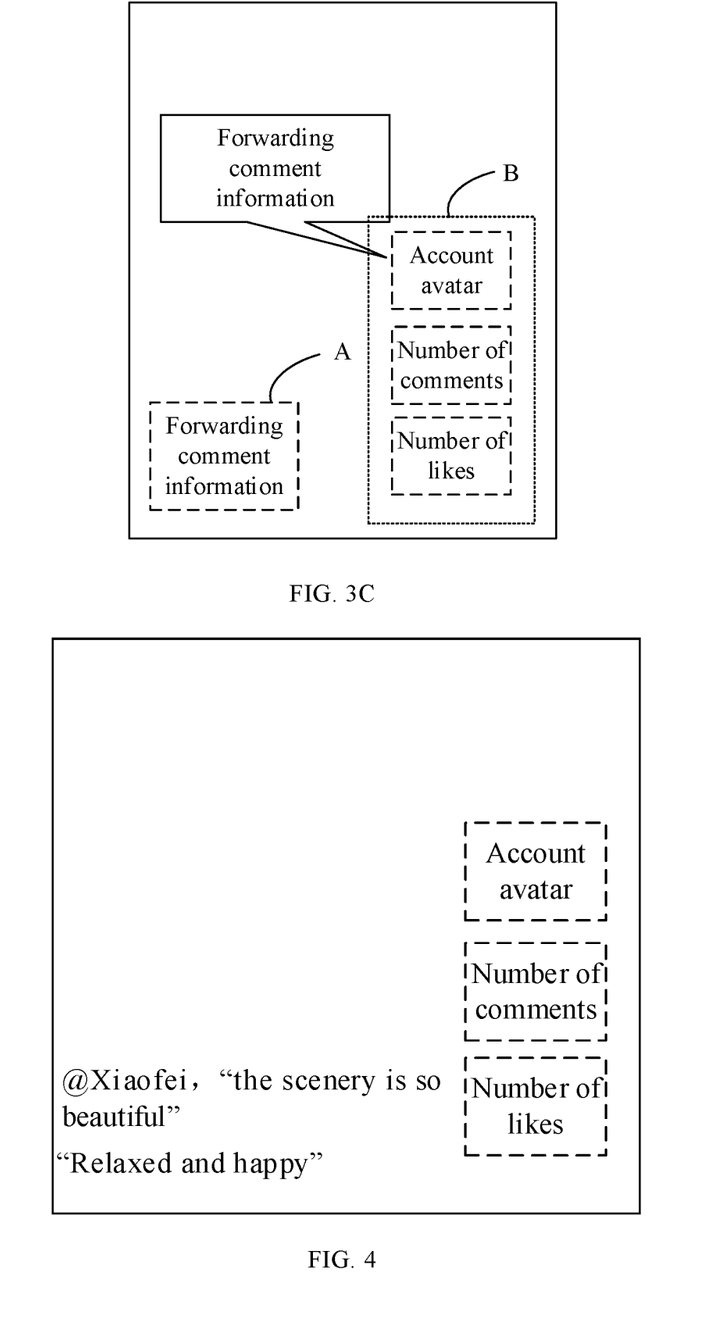
FIG. 3C is another schematic diagram of a play interface according to an embodiment of the present disclosure.
FIG. 4 is another schematic diagram of a play interface according to an embodiment of the present disclosure.

It can be understood that, while the forwarding comment information and the forwarding user information are associated and displayed in the specified special effect, the forwarding comment information may be displayed in a specific region. For example, in the schematic diagram of the play interface illustrated in FIG. 3C, while displaying the forwarding comment information in the bubble special effect, the forwarding comment information is also displayed in the region A in FIG. 3C. Further, after stopping the display of the forwarding comment information in the bubble special effect, the play interface may be changed to that as illustrated in FIG. 3B. In order to help the user to know other information about the forwarded video, the forwarding user information such as the account avatar, the number of comments on the forwarded video, the number of likes, etc., may be displayed on the play interface, for example, in region B as illustrated in FIG. 3A to FIG. 3C.

In an embodiment of the present disclosure, the method further includes: displaying, on the play interface of the video works of the forwarding user, relevant information of a creator of the original video.

In this embodiment of the present disclosure, the relevant information of the creator includes at least one of the creator's comment information on the original video, and information of the creator.

In practical applications, in order to facilitate the user to know the information of the creator of the forwarded video when watching the forwarded video, such as the creator's thoughts on the forwarded video, the relevant information of the creator, such as the creator's comment information on the original video, the creator's account information, etc., may be displayed on the play interface of the video works of the forwarding user (that is, the relevant information of the creator is displayed while playing the original video) when receiving a play trigger action for the forwarded video.

When the original video is an originally created video, the creator of the original video is the one who posted the original video. When the original video is a forwarded video of another user, the creator of the original video may be a creator of the original video corresponding to the forwarded video, or the one who owns the original video when the forwarding user forwards the original video. For example, a user A posts an original video a, the original video a is forwarded by a user B, to obtain a forwarded video b; when the forwarded video b is forwarded by a user C, a forwarded video c is obtained by the user C, as the forwarding user. In this case, the relevant information of the creator displayed on the play interface of the video works of the forwarding user may be the relevant information of the user A and/or the relevant information of the user B.

In an embodiment of the present disclosure, said displaying the relevant information of the creator of the original video includes: displaying prompt information of the relevant information of the creator; and displaying, in response to receiving a trigger operation for the prompt information, the relevant information of the creator.

In practical applications, some users may want to know the relevant information of the creator of the forwarded video, but some users may not want to know the relevant information of the creator of the forwarded video. In this case, a prompt information of the relevant information of the creator may be displayed on the play interface to inform the user whether the relevant information of the creator shall be displayed. Further, when the user's trigger operation for the prompt information is received, it indicates that the user wants to check the relevant information of the creator, and thus, the relevant information of the creator of the original video may be displayed.

The relevant information of the creator and the specific display position thereof may be preset, which are not limited in the embodiments of the present disclosure. For example, the relevant information of the creator may be set to be the creator's account name in the video interactive application, the creator's comment information on the original video, etc.; and the specific display position may be in the same region as that where the forwarding comment information is displayed or in a region different from that where the forwarding comment information is displayed. For example, the creator's comment information on the original video, the creator's account name in the video interactive application, and the forwarding user's forwarding comment information on the original video may be displayed in sequence in the lower left region of the play interface for the user to check.

In an example, the creator's relevant information is the creator's account name "@ Xiaofei" in the video interactive application, and the creator's comment information on the original video is "the scenery is so beautiful". When the forwarding user forwards the original video, the forwarding comment information on the original video is "relaxed and happy". The account avatar of the forwarding user, the number of comments and the number of likes of the forwarded video, and other information are displayed. In this case, the play interface is illustrated in FIG. 4.

In an embodiment of the present disclosure, the method further includes: jumping, in response to receiving a creator information checking operation, to a specified interface associated with the creator from a current play interface.

In practical applications, the user may also receive the creator information checking operation on the play interface. The creator information checking operation indicates that the user wants to check the creator's specific information, such as the creator's nickname, gender, posted videos, etc. In this case, once receiving the creator information checking operation, the current play interface may be jumped to a specified interface associated with the creator.

The creator information checking operation may be triggered in a preset manner, which is not specifically limited in the embodiments of the present disclosure. For example, a virtual button configured to trigger the creator information checking operation may be provided on the play interface. When the user clicks on the virtual button, it is deemed that the creator information checking operation is triggered by the user. In practical applications, in order to reduce the occupation rate of other information on the screen and improve the user's viewing experience, the position where the relevant information of the creator is displayed on the play interface may be set to be the position of the virtual button. In this case, when the user clicks on the relevant information of the creator displayed on the play interface, it is deemed that the creator information checking operation is triggered. The specified interface associated with the creator may be preset, which is not specifically limited in the embodiments of the present disclosure. For example, the specified interface associated with the creator may be an interface of video list posted by the creator, or a creator's account information interface.

In an embodiment of the present disclosure, when the original video has been deleted by the creator, the method further includes, in response to receiving the play operation for the forwarded video: displaying prompt information that the original video of the forwarded video has been deleted; and displaying the forwarding comment information.

In practical applications, the forwarded video is not a video that is practically recorded by the forwarding user, and thus the video resource (i.e., the original video) cannot be obtained if the original video has been deleted by the creator. In this case, the prompt information that the original video of the forwarded video has been deleted shall be displayed to inform the user.

Further, when the play trigger operation for the forwarded video is received, the original video of the forwarded video will not be played, and the prompt information that the original video has been deleted will be displayed. Of course, in practical applications, when displaying the prompt information that the original video has been deleted, other information of the forwarded video may also be displayed. For example, the forwarding comment information, the relevant information of the creator, the number of comments on the forwarded video, the number of likes, and the account avatar information of the second user, etc. may be displayed at the same time.

Figure 5:
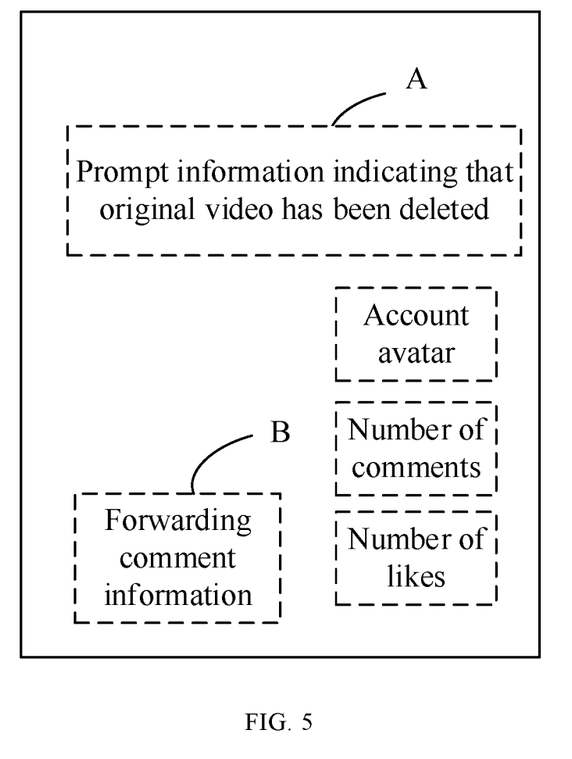
FIG. 5 is a schematic diagram of a comment information input interface according to an embodiment of the present disclosure.

In an example, as illustrated in FIG. 5, the prompt information that the original video has been deleted may be displayed in the region A in FIG. 5; the forwarding comment information provided by the second user on the forwarded video may be displayed in the region B; and the number of comments and likes of the forwarded video, and the account avatar information of the second forwarding user may be displayed at the same time.

In an embodiment of the present disclosure, the forwarding comment information is obtained by: displaying, in response to receiving the forwarding user's forwarding trigger operation on the original video, a forwarding comment editing interface; and receiving, through the forwarding comment editing interface, the forwarding comment information provided by the forwarding user on the original video.

In practical applications, while the forwarding user wants to forward the original video, the forwarding trigger operation on the original video may be triggered, and the comment forwarding comment editing interface is displayed, on which the user may input the forwarding comment information. The forwarding trigger operation may be triggered in a preset manner, which is not limited in the embodiments of the present disclosure. For example, when the display interface of the original video is pressed by the forwarding user for a preset time length, it is deemed that the forwarding trigger operation on the original video is triggered by the forwarding user. In another example, a virtual button for triggering the forwarding trigger operation may be provided in the display interface of the original video, and when the forwarding user clicks on the virtual button, it is deemed that the forwarding trigger operation on the original video is triggered by the forwarding user.

Further, when receiving the forwarding confirmation operation of the forwarding user, it indicates that the forwarding user has completed the input of the forwarding comment information and wants to forward the original video. In this case, a video forwarding request may be generated based on the forwarding comment information and sent to a server. Correspondingly, the server may post the forwarded video based on the video forwarding request, and thus the forwarded video is obtained.

In an embodiment of the present disclosure, relevant information of the creator is displayed on the forwarding comment editing interface.

In order to further help the user to know the relevant information of the creator, the relevant information of the creator of the forwarded video may also be displayed on the forwarding comment editing interface. The description of the relevant information of the creator may refer to the above description, which will not be repeated here.

Figure 6:
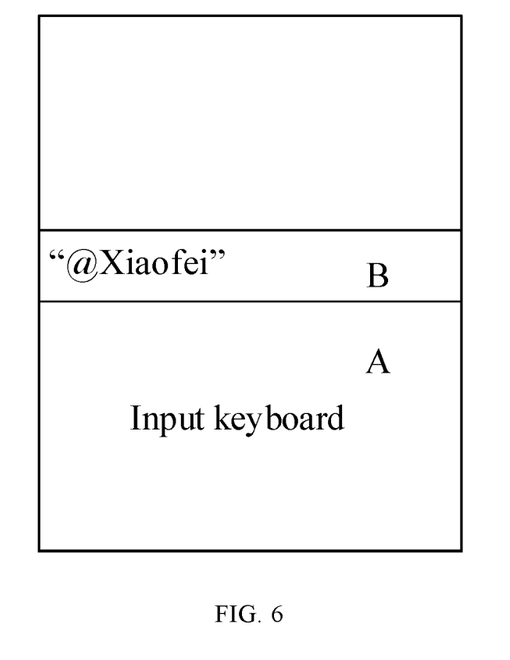
FIG. 6 is a schematic diagram of a play interface according to an embodiment of the present disclosure.

In an example, FIG. 6 illustrates a schematic diagram of a comment forwarding comment editing interface according to an embodiment of the present disclosure. In FIG. 6, an input keyboard is displayed in the region A, allowing the forwarding user to input the forwarding comment information; and the relevant information of the creator is displayed in the region B, such as the creator's account name "@Xiaofei".

Figure 7:
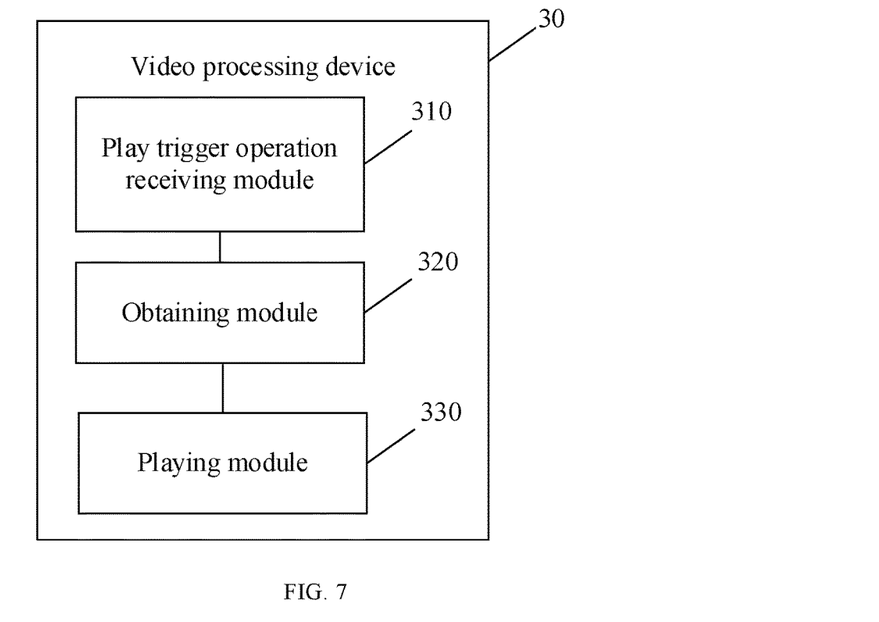
FIG. 7 is a schematic structural diagram of a video processing apparatus according to an embodiment of the present disclosure.

Based on the same principle as the method illustrated in FIG. 1, an embodiment of the present disclosure further provides a video processing apparatus 30. As illustrated in FIG. 7, the video processing apparatus 30 may include a play trigger operation receiving module 310, an obtaining module 320, and a playing module 330. The play trigger operation receiving module 310 is configured to receive a play trigger operation for a forwarded video. The forwarded video is forwarded from an original video by a forwarding user. The obtaining module 320 is configured to obtain the original video, and forwarding comment information provided by the forwarding user on the original video when forwarding the original video. The playing module 330 is configured to play the original video on a play interface of video works of the forwarding user, and display the forwarding comment information.

Optionally, the playing module, when displaying the forwarding comment information, is specifically configured to display, in a specified display mode, the forwarding comment information on the play interface of the video works of the forwarding user, in which the specified display mode includes associating and displaying the forwarding comment information and information of the forwarding user in a specified special effect, and a display time length of the specified special effect.

Optionally, the playing module, when displaying, in a specified display mode, the forwarding comment information on the play interface of the video works of the forwarding user, is further configured to: stop, in response to a duration of displaying the specified special effect being equal to the display time length, a display of the specified special effect; or stop, in response to receiving a stop display operation for the specified special effect, the display of the specified special effect.

Optionally, the playing module is further configured to display, on the play interface of the video works of the forwarding user, relevant information of a creator of the original video.

Optionally, the playing module, when displaying the relevant information of the creator of the original video, is specifically configured to display prompt information about the relevant information of the creator; and display, in response to receiving a triggering operation for the prompt information, the relevant information of the creator.

Optionally, the relevant information of the creator includes at least one of the creator's comment information on the original video, and information of the creator.

Optionally, the apparatus further includes an interface jumping apparatus, configured to jump, in response to receiving a creator information checking operation, to a specified interface associated with the creator from a current play interface.

Optionally, when the original video has been deleted by the creator, the playing module is further configured to: display, in response to receiving the play operation for the forwarded video, prompt information that the original video of the forwarded video has been deleted; and display the forwarding comment information.

Optionally, the forwarding comment information is obtained by: displaying, in response to receiving the forwarding user's forwarding trigger operation on the original video, a forwarding comment editing interface; and receiving, through the forwarding comment editing interface, the forwarding comment information provided by the forwarding user on the original video.

Optionally, relevant information of the creator is displayed on the forwarding comment editing interface.

The video processing apparatus in the embodiments of the present disclosure may execute a video processing method provided by the embodiments of the present disclosure, and the implementation principle thereof is similar. Actions performed by each module in the video processing apparatus in respective embodiments of the present disclosure correspond to actions in the video processing method in respective embodiments of the present disclosure. The detailed functional description of respective modules of the video processing apparatus may refer to the description in the corresponding video processing method illustrated above, which will not be repeated here.

Based on the same principles as the method illustrated in the embodiments of the present disclosure, the embodiments of the present disclosure also provide an electronic device. The electronic device may include, but not limited to, a processor and a memory. The memory has computer operation instructions stored thereon. The processor is configured to, by calling the computer operating instructions, implement the method illustrated in the embodiments.

Based on the same principles as the methods illustrated in the embodiments of the present disclosure, the embodiments of the present disclosure further provide a computer-readable storage medium. The computer-readable storage medium has at least one instruction, at least one piece of program, a set of codes or a set of instructions stored thereon. The at least one instruction, the at least one piece of program, the set of codes or the set of instructions is loaded and executed by a processor to implement the method illustrated in the above embodiments, which will not be repeated here.

Figure 8:
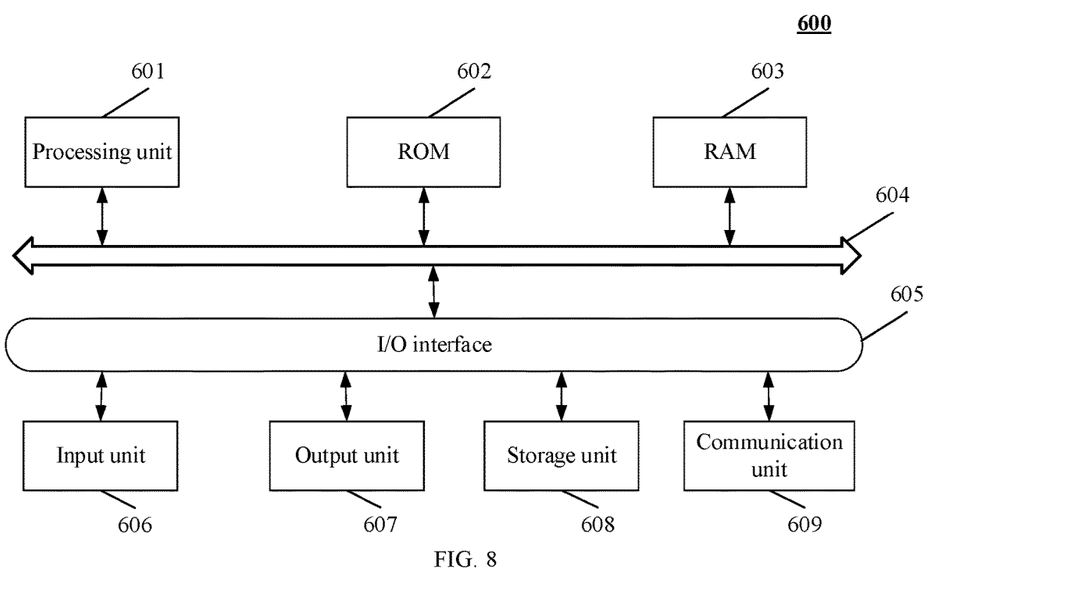
FIG. 8 is a schematic structural diagram of an electronic device according to an embodiment of the present disclosure.

FIG. 8 is a structural schematic diagram of an electronic device 600 adapted to implement the embodiments of the present disclosure. Referring to FIG. 8, the terminal device according to the embodiments of the present disclosure may include, but not limited to, a mobile terminal such as a mobile phone, a laptop computer, a digital broadcast receiver, a Personal Digital Assistant (PDA), a tablet computer or PAD, a Portable Multimedia Player (PMP), or a vehicle-mounted terminal (e.g., a vehicle-mounted navigation terminal); or a fixed terminal such as a digital TV, a desktop computer, etc. The electronic device illustrated in FIG. 8 is merely for illustrative, and it should not be construed as limiting the function and scope of use of the embodiments of the present disclosure.

The electronic device includes a memory and a processor. The processor may be referred to as the processing unit 601 below. The memory may include at least one of a Read-Only Memory (ROM) 602, a Random Access Memory (RAM) 603, and a storage unit 608 below, as illustrated in detail below.

As illustrated in FIG. 8, the electronic device 600 may include a processing unit (such as a central processing unit, a graphics processing unit, etc.) 601, which may perform various appropriate actions and processes in accordance with programs stored in a Read-Only Memory (ROM) 602 or loaded from a storage unit 608 into a Random Access Memory (RAM) 603. In the RAM 603, various programs and data required for the operation of the electronic device 600 may also be stored. The processing unit 601, the ROM 602, and the RAM 603 are connected to each other through a bus 604. An input/output (I/O) interface 605 is also connected to the bus 604.

Generally, the following units may be connected to the I/O interface 605: an input unit 606 including, for example, a touch screen, a touch pad, a keyboard, a mouse, a camera, a microphone, an accelerometer, a gyroscope, etc.; an output unit 607 including, for example, a Liquid Crystal Display (LCD), a speaker, an oscillator, etc.; a storage unit 608 including, for example, a magnetic tape or a hard disk, etc.; and a communication unit 609. The communication unit 609 may allow the electronic device 600 to perform wireless or wired communication with other devices for data exchange. Although FIG. 8 illustrates the electronic device 600 having various apparatuses, it can be appreciated that it is not necessary to implement or provide all the illustrated apparatuses. Alternatively, more or fewer apparatuses may be implemented or provided.

In particular, according to the embodiments of the present disclosure, the processes described above with reference to the flowcharts may be implemented as computer software programs. For example, the embodiments of the present disclosure include a computer program product, which includes a computer program carried on a non-transitory computer readable medium. The computer program includes program codes for implementing the method illustrated in any of the flowcharts. In these embodiments, the computer program may be downloaded and installed from a network through the communication unit 609, or installed from the storage unit 608, or installed from the ROM 602. When the computer program is executed by the processing unit 601, the above functions defined in the methods according to the embodiments of the present disclosure are performed.

It should be noted that the above computer-readable medium in the present disclosure may be a computer-readable signal medium, or a computer-readable storage medium, or a combination thereof. The computer-readable storage medium may be, but not limited to, an electrical, magnetic, optical, electromagnetic, infrared, or semiconductor system, apparatus, or device, or any combination thereof. More specific examples of the computer-readable storage medium may include, but not limited to: an electrical connection having one or more wires, a portable computer disk, a hard disk, a Random Access Memory (RAM), a Read Only Memory (ROM), an Erasable Programmable Read Only Memory (EPROM) or a flash memory, an optical fiber, a Compact Disc Read-Only Memory (CD-ROM), an optical memory device, a magnetic memory device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier that carries computer-readable program codes. Such propagated data signal may be in various forms, including, but not limited to, an electromagnetic signal, an optical signal, or any suitable combination thereof. The computer-readable signal medium may also be any computer-readable medium other than the computer-readable storage medium, capable of transmitting, propagating, or transferring programs used by or used with an instruction execution system, apparatus, or device. The program codes stored on the computer-readable medium may be transmitted via any appropriate medium, which includes, but not limited to, electric cable, optical cable, Radio Frequency (RF), etc., or any suitable combination thereof.

In some embodiments, the client and server may communicate with any currently known or future-developed network protocol such as Hypertext Transfer Protocol (HTTP), and they may be interconnected through any form or medium of digital data communication (for example, communication network). Examples of communication networks include local area networks ("LAN"), wide area networks ("WAN"), the internet work (for example, the Internet), and end-to-end networks (for example, ad hoc end-to-end networks), as well as any networks currently known or developed in the future.

The above computer-readable medium may be included in the above electronic device, or it may be standalone without being assembled into the electronic device.

The computer program code used to perform the operations of this disclosure may be written in one or more programming languages or a combination thereof. The above programming languages include, but not limited to, object-oriented programming languages such as Java, Smalltalk, C++, and include conventional procedural programming languages such as "C" language or similar programming languages. The program code may be executed entirely on the user's computer, partly on the user's computer, executed as an independent software package, partly on the user's computer and partly executed on a remote computer, or entirely executed on the remote computer or server. In the case of a remote computer, the remote computer may be connected to the user's computer through any kind of network, including a local area network (LAN) or a wide area network (WAN), or it may be connected to an external computer (for example, using an Internet service provider to pass Internet connection).

The flowcharts and block diagrams in the drawings illustrate the possible implementations of the system architecture, functions, and operations of the system, method, and computer program product according to respective embodiments of the present disclosure. In this regard, each block in the flowcharts or block diagrams may represent a module, a program segment, or a part of code, and the module, the program segment, or the part of code contains one or more executable instructions for implementing the specified logic function. It should also be noted that, in some alternative implementations, the functions marked in the block may also be performed in an order other than that illustrated in the drawings. For example, two blocks illustrated in succession may be executed substantially in parallel, and they may sometimes be executed in a reverse order, depending on the functions involved. It should also be noted that each block in the block diagrams and/or flowcharts, and the combination of the blocks in the block diagrams and/or flowcharts, may be implemented by a dedicated hardware-based system for performing the specified functions or operations or may be implemented by a combination of dedicated hardware and computer instructions.

The modules or units involved in the embodiments described in the present disclosure may be implemented in software or hardware. The name of the module or unit does not constitute a limitation of the unit itself under certain circumstances.

The functions described above may be performed at least in part by one or more hardware logic components. For example, unrestrictedly, examples of hardware logic components that may be used include Field Programmable Gate Array (FPGA), Application Specific Integrated Circuit (ASIC), Application Specific Standard Product (ASSP), System on Chip (SOC), Complex Programmable Logic Device (CPLD), etc.

In the context of the present disclosure, a machine-readable medium may be a tangible medium including or storing programs, which may be used by or together with an instruction execution system, apparatus, or device. The machine-readable medium may be a machine-readable signal medium or a machine-readable storage medium. The machine-readable medium may be, but not limited to, an electrical, magnetic, optical, electromagnetic, infrared, or semiconductor system, apparatus, or device, or any suitable combination thereof. More specific examples of the machine-readable storage media may include an electrical connection having one or more wires, a portable computer disk, a hard disk, a Random Access Memory (RAM), a Read Only Memory (ROM), an Erasable Programmable Read Only Memory (EPROM or a flash memory), an optical fiber, a Compact Disc Read-Only Memory (CD-ROM), an optical memory device, a magnetic memory device, or any suitable combination thereof.

According to one or more embodiments of the present disclosure, a video processing method is provided. The video processing method includes: receiving a play trigger operation for a forwarded video, the forwarded video being forwarded from an original video by a forwarding user; obtaining the original video, and forwarding comment information provided by the forwarding user on the original video when forwarding the original video; and playing the original video on a play interface of video works of the forwarding user, and displaying the forwarding comment information.

According to one or more embodiments of the present disclosure, said displaying the forwarding comment information includes: displaying, in a specified display mode, the forwarding comment information on the play interface of the video works of the forwarding user, in which the specified display mode includes associating and displaying the forwarding comment information and information of the forwarded user in a specified special effect, and a display time length of the specified special effect.

According to one or more embodiments of the present disclosure, said displaying, in the specified display mode, the forwarding comment information on the play interface of the video works of the forwarding user includes: stopping, in response to a duration of displaying the specified special effect being equal to the display time length, a display of the specified special effect; or stopping, in response to receiving a stop display operation for the specified special effect, the display of the specified special effect.

According to one or more embodiments of the present disclosure, the method further includes: displaying, on the play interface of the video works of the forwarding user, relevant information of a creator of the original video.

According to one or more embodiments of the present disclosure, said displaying the relevant information of the creator of the original video includes: displaying prompt information about the relevant information of the creator; and displaying, in response to receiving a triggering operation for the prompt information, the relevant information of the creator.

According to one or more embodiments of the present disclosure, the relevant information of the creator includes at least one of: the creator's comment information on the original video, and information of the creator.

According to one or more embodiments of the present disclosure, the method further includes: jumping, in response to receiving a creator information checking operation, to a specified interface associated with the creator from a current play interface.

According to one or more embodiments of the present disclosure, when the original video has been deleted by the creator, the method further includes, in response to receiving the play operation for the forwarded video: displaying prompt information that the original video of the forwarded video has been deleted; and displaying the forwarding comment information.

According to one or more embodiments of the present disclosure, the forwarding comment information is obtained by: displaying, in response to receiving the forwarding user's forwarding trigger operation on the original video, a forwarding comment editing interface; and receiving, through the forwarding comment editing interface, the forwarding comment information provided by the forwarding user on the original video.

According to one or more embodiments of the present disclosure, the forwarding comment editing interface displays relevant information of the creator.

According to one or more embodiments of the present disclosure, a video processing apparatus is provided. The video processing apparatus includes: a play trigger operation receiving module configured to receive a play trigger operation for a forwarded video, the forwarded video being forwarded from an original video by a forwarding user; an obtaining module configured to obtain the original video, and forwarding comment information provided by the forwarding user on the original video when forwarding the original video; and a playing module configured to play the original video on a play interface of video works of the forwarding user, and display the forwarding comment information.

According to one or more embodiments of the present disclosure, the playing module, when displaying the forwarding comment information, is specifically configured to: display, in a specified display mode, the forwarding comment information on the play interface of the video works of the forwarding user. The specified display mode includes associating and displaying the forwarding comment information and information of the forwarded user in a specified special effect, and a display time length of the specified special effect.

According to one or more embodiments of the present disclosure, when displaying the forwarding comment information in a specified display mode on the play interface of the video works of the forwarding user, the playing module is further configured to: stop, in response to a duration of displaying the specified special effect being equal to the display time length, a display of the specified special effect; or stop, in response to receiving a stop display operation for the specified special effect, the display of the specified special effect.

According to one or more embodiments of the present disclosure, the playing module is further configured to: display, on the play interface of the video works of the forwarding user, relevant information of a creator of the original video.

According to one or more embodiments of the present disclosure, the playing module, when displaying the relevant information of the creator of the original video, is specifically configured to: display prompt information about the relevant information of the creator; and display, in response to receiving a triggering operation for the prompt information, the relevant information of the creator.

According to one or more embodiments of the present disclosure, the relevant information of the creator includes at least one of: the creator's comment information on the original video, and information of the creator.

According to one or more embodiments of the present disclosure, the apparatus further includes an interface jumping apparatus, which is specifically configured to jump, in response to receiving a creator information checking operation, to a specified interface associated with the creator from a current play interface.

According to one or more embodiments of the present disclosure, when the original video has been deleted by the creator, the display module is further configured to display, in response to receiving the play operation for the forwarded video, prompt information that the original video of the forwarded video has been deleted; and display the forwarding comment information.

According to one or more embodiments of the present disclosure, the forwarding comment information is obtained by: displaying, in response to receiving the forwarding user's forwarding trigger operation on the original video, a forwarding comment editing interface; and receiving, through the forwarding comment editing interface, the forwarding comment information provided by the forwarding user on the original video.

According to one or more embodiments of the present disclosure, relevant information of the creator is displayed on the forwarding comment editing interface.

According to one or more embodiments of the present disclosure, an electronic device is provided. The electronic device includes a memory having computer operation instructions stored thereon, and a processor. The processor is configured to, by calling the computer operating instructions, implement any step of the video processing method.

According to one or more embodiments of the present disclosure, a computer-readable medium is provided. The computer-readable medium has at least one instruction, at least one piece of program, a set of codes or a set of instructions stored thereon. The at least one instruction, the at least one piece of program, the set of codes or the set of instructions is loaded and executed by a processor to implement any step of the video processing method.

The above description is only about the preferred embodiments of the present disclosure and an explanation of the applied technical principles. Those skilled in the art should understand that the scope of disclosure involved in the present disclosure is not limited to the technical solutions formed by the specific combination of the above technical features, and should also cover other technical solutions formed by any combination of the above technical features or their equivalent features without departing from the above disclosed concept, e.g., technical solutions formed by mutually replacement of the above features and the technical features disclosed in the present disclosure (but not limited to) with similar functions.

In addition, although the operations are described in a specific order, which should not be understood as that these operations are required to be performed in the specific order as illustrated or performed in a sequential order. Under certain circumstances, multitasking and parallel processing may be advantageous. Likewise, although several specific implementation details are included in the above discussion, these should not be construed as limiting the scope of the disclosure. Certain features that are described in the context of separate embodiments may also be implemented in combination in a single embodiment. Conversely, various features described in the context of a single embodiment may also be implemented in a plurality of embodiments individually or in any suitable sub-combination.

Although the subject matters have been described in language specific to structural features and/or logical actions of the method, it should be understood that the subject matters defined in the appended claims are not necessarily limited to the specific features or actions described above. On the contrary, the specific features and actions described above are merely exemplary forms of implementing the claims.

What is claimed is:

1. A video processing method for a video interactive application, comprising:
   receiving a request for playing a forwarded video, the forwarded video being forwarded from an original video by a forwarding user in the video interactive application, wherein the original video was created by a first user, wherein the first user is a user different from the forwarding user, and wherein the forwarded video is added into a list of video works of the forwarding user in response to determining the original video is forwarded by the forwarding user;
   obtaining the original video corresponding to the forwarded video, and obtaining forwarding comment information provided by the forwarding user on the original video when forwarding the original video; and
   displaying the original video and the forwarding comment information on a play interface in response to the request for playing the forwarded video, wherein the play interface is configured to play the video works of the forwarding user, wherein displaying the forwarding comment information further comprises displaying an effect.

2. The method according to claim 1, wherein said displaying the forwarding comment information comprises:
   displaying, in a specified display mode, the forwarding comment information on the play interface of the video works of the forwarding user, wherein the specified display mode comprises associating and displaying the forwarding comment information and information of the forwarded user in a specified effect, and a display time length of the specified effect.

3. The method according to claim 2, wherein, in the specified display mode, the forwarding comment information and the information of the forwarded user are associated and displayed in the specified effect within the display time length.

4. The method according to claim 2, wherein said displaying, in the specified display mode, the forwarding comment information on the play interface of the video works of the forwarding user comprises:
stopping, in response to a duration of displaying the specified effect being equal to the display time length, a display of the specified effect; or
stopping, in response to receiving a stop display operation for the specified effect, the display of the specified effect.

5. The method according to claim 4, further comprising:
jumping, in response to receiving a creator information checking operation, to a specified interface associated with the creator from a current play interface.

6. The method according to claim 1, further comprising:
displaying, on the play interface of the video works of the forwarding user, relevant information of a creator of the original video.

7. The method according to claim 6, wherein said displaying the relevant information of the creator of the original video comprises:
displaying prompt information about the relevant information of the creator; and
displaying, in response to receiving a triggering operation for the prompt information, the relevant information of the creator.

8. The method according to claim 7, wherein the relevant information of the creator comprises at least one of: the creator's comment information on the original video, and information of the creator.

9. The method according to claim 6, further comprising:
jumping, in response to receiving a creator information checking operation, to a specified interface associated with the creator from a current play interface.

10. The method according to claim 1, wherein, when the original video has been deleted by the creator, the method further comprises, in response to receiving the play operation for the forwarded video:
displaying prompt information that the original video of the forwarded video has been deleted; and
displaying the forwarding comment information.

11. The method according to claim 1, wherein the forwarding comment information is obtained by:
displaying, in response to receiving the forwarding user's forwarding trigger operation on the original video, a forwarding comment editing interface; and
receiving, through the forwarding comment editing interface, the forwarding comment information provided by the forwarding user on the original video.

12. The method according to claim 11, wherein relevant information of the creator is displayed on the forwarding comment editing interface.

13. An electronic device, comprising
a memory having computer operation instructions stored thereon; and
a processor,
wherein the processor is configured to, by calling the computer operating instructions, implement a video processing method, comprising:
receiving a request for playing a forwarded video, the forwarded video being forwarded from an original video by a forwarding user, wherein the original video was created by a first user, wherein the first user is a user different from the forwarding user, and wherein the forwarded video is added into a list of video works of the forwarding user in response to determining the original video is forwarded by the forwarding user;
obtaining the original video corresponding to the forwarded video, and obtaining forwarding comment information provided by the forwarding user on the original video when forwarding the original video; and
displaying the original video and the forwarding comment information on a play interface in response to the request for playing the forwarded video, wherein the play interface is configured to play the video works of the forwarding user, wherein displaying the forwarding comment information further comprises displaying an effect.

14. A non-transitory computer-readable medium, having at least one instruction, at least one piece of program, a set of codes, or a set of instructions stored thereon,
wherein the at least one instruction, the at least one piece of program, the set of codes, or the set of instructions is loaded and executed by a processor to implement a video processing method, comprising:
receiving a request for playing a forwarded video, the forwarded video being forwarded from an original video by a forwarding user, wherein the original video was created by a first user, wherein the first user is a user different from the forwarding user, and wherein the forwarded video is added into a list of video works of the forwarding user in response to determining the original video is forwarded by the forwarding user;
obtaining the original video corresponding to the forwarded video, and obtaining forwarding comment information provided by the forwarding user on the original video when forwarding the original video; and
displaying the original video on a play interface, wherein the play interface is configured to play the video works of the forwarding user in response to the request for playing the forwarded video, wherein displaying the forwarding comment information further comprises displaying an effect.

* * * * *